UNITED STATES PATENT OFFICE.

WILLIAM P. M. GRELCK, OF LINCOLN, NEBRASKA, ASSIGNOR TO BERTHA H. GRELCK, OF LINCOLN, NEBRASKA.

BAKING COMPOUND.

1,322,561. Specification of Letters Patent. Patented Nov. 25, 1919.

No Drawing. Application filed December 4, 1915. Serial No. 64,972.

*To all whom it may concern:*

Be it known that I, WILLIAM P. M. GRELCK, a citizen of the United States, residing at the city of Lincoln, in the county of Lancaster and State of Nebraska, have invented certain new and useful Improvements in Baking Compounds, of which the following is a specification.

My invention relates to baking compounds which are mixed with food ingredients and which by the action of warmth or heat in the presence of water give off gases which act to lighten the product. The baking powders in general use may be divided into three classes, in which either cream of tartar, alum or an acid phosphate is combined with a suitable alkali—a "binder" comprising starch, sugar or other similar materials being added. It is believed that none of the said products, with the exception of a small amount of "binder" material, contains anything of food value. And where baking powders are used, and it is desired to introduce milk solids, in addition to the other ingredients, for the improved quality which they give to the baked product this must be done by the use of fluid sweet milk or its equivalent. Moreover the ordinary baking powders by their chemical reactions leave a residuum such as Rochelle salts, which have medicinal properties, and are therefore objectionable for that reason.

It will be recalled that all commercial baking powders are a matter of convenience, and that they were originally introduced to provide leavening for cake and similar baked products for which sour milk and soda combined with saleratus or other alkalis, previously to that time were commonly used. In fact it is thought by many that no baking powder in which an artificial acid is used, can produce results equal to those which can be obtained when the natural acid of soured milk is combined with a suitable alkali.

It is the object of my invention to provide a baking powder which shall form not only the leavening agent, but provide a considerable amount of milk solids which have their full food value and contribute their normal benefit in improving the product the same as if the fluid milk were used. In other words, I seek to combine the practical results of the old fashioned "sour milk and soda", in a cheap, convenient and commercial form.

In carrying out the principles of my invention, I preferably take skimmed milk or buttermilk and sour the same under such conditions as to produce the greatest practicable amount of lactic acid. The operation of the lactic acid bacteria is to generate lactic acid up to about $\frac{7}{10}$ of one per cent. of the entire volume of the milk, at which point the action of the bacteria is self limited. I prefer to sour the milk under such conditions that as soon as the casein begins to be precipitated, (which it is by the action of heat and the production of lactic acid), the mass can be agitated. The casein then becomes more or less flocculent and will later be agglomerated into a mass of very fine non-adherent particles. The process may be retarded by keeping the heat below a temperature of about 168 degrees, the casein being practically all precipitated. The process may be continued at a higher temperature, whereby milk albumen will also be precipitated and conserved.

The resulting mass is dried, preferably *in vacuo.* When the water is evaporated, the resultant product will have an effective combined lactic acid content of about seven per cent., provided the original treatment of the milk has been carried to the limit of production. The desiccated product should now be reduced to a fine powder and a suitable alkali (preferably sodium bicarbonate) should be added and thoroughly incorporated with the mass. The amount of alkali used should be sufficient to neutralize the lactic acid when water is added, although slight excess of alkali can do no harm and may in fact be an advantage. It will be seen that the bulk of the milk product is great enough that the added alkali will be well extended and excellent keeping qualities result without the aid of a special "binder". The casein and other milk products provide an addition to the compound of high dietetic value and take the place of sweet milk or its equivalent, which, in most cases, would otherwise be required. The compound is used in the usual way by mixing it with flour and the other baking ingredients and the addition of water. The source of supply of the fundamental materials, viz., skimmed milk or buttermilk, is practically unlimited, and makes it possible to obtain them by simple means and at a very low cost.

Having thus fully described my invention what I claim as new and desire to secure by Letters Patent is—

1. A leavening baking compound consisting of desiccated solids of sour milk and an alkaline salt of carbonic acid.

2. A leavening baking compound consisting of desiccated solids of sour milk and an alkaline salt of carbonic acid in such quantity as to neutralize the lactic acid of said milk solids in the presence of water.

3. A leavening baking compound consisting of desiccated solids of sour milk and an alkaline salt adapted to combine with water and the lactic acid of said milk solids with the evolution of carbon dioxid.

4. A leavening compound consisting of desiccated solids of sour milk and sodium bicarbonate in such quantity as to neutralize the lactic acid of said milk solids and produce the maximum volume of carbon-dioxid.

5. The method of making a leavening baking compound which consists in precipitating the solids of sour milk, evaporating the water therefrom, reducing the desiccated solids to pulverulent form and intimately mixing therewith an alkaline salt adapted to combine with water and the acid of said milk solids with the evolution of carbon-dioxid.

6. A leavening baking compound consisting of desiccated solids of sour milk and sodium bicarbonate.

7. In a baking powder; the combination with milk casein having the particles thereof precipitated and dried in substantially non-adherent form, of lactic acid and an alkaline salt adapted in the presence of water to combine with the lactic acid and evolve a leavening gas.

8. In a baking powder; the combination with desiccated residuum of soured milk having a lactic acid content and having the casein precipitated in substantially non-adherent particles, of an alkaline salt adapted in the presence of water to combine with the lactic acid and evolve a leavening gas.

9. In a baking powder; the combination of a dry casein content in the form of precipitated, fixed, discontinuous, non-adherent particles, lactic acid, and an alkaline salt intermingled therewith and adapted to combine with the lactic acid in the presence of water to give off a leavening gas.

10. A baking powder comprising the dry casein of soured milk in the form of fixed, discontinuous particles, and an alkaline salt adapted in the presence of water to combine with the lactic acid of said soured milk and give off a leavening gas.

11. A baking powder comprising the dry solids of soured milk in which the casein is present in the form of fixed, discontinuous particles, and an alkaline salt adapted in the presence of water to combine with the lactic acid of said soured milk and give off a leavening gas.

In witness whereof I have hereunto subscribed my name this 2nd day of December, 1915, in the presence of two subscribing witnesses.

WILLIAM P. M. GRELCK.

Witnesses:
C. K. CHAMBERLAIN,
A. S. PHILLIPS.